US012608926B2

(12) United States Patent
Menke et al.

(10) Patent No.: US 12,608,926 B2
(45) Date of Patent: Apr. 21, 2026

(54) METHOD AND DEVICE FOR TRAINING A NEURAL NETWORK

(71) Applicant: Robert Bosch GmbH, Stuttgart (DE)

(72) Inventors: Maximilian Menke, Diekholzen (DE);
Reiko Lettmoden, Braunschweig (DE);
Thomas Wenzel, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 18/302,230

(22) Filed: Apr. 18, 2023

(65) Prior Publication Data

US 2023/0351741 A1      Nov. 2, 2023

(30) Foreign Application Priority Data

Apr. 29, 2022    (DE) ..................... 10 2022 204 263.8

(51) Int. Cl.
| | |
|---|---|
| *G06V 10/82* | (2022.01) |
| *G06V 10/75* | (2022.01) |
| *G06V 20/40* | (2022.01) |
| *G06V 20/58* | (2022.01) |

(52) U.S. Cl.
CPC ............ *G06V 10/82* (2022.01); *G06V 10/751* (2022.01); *G06V 20/49* (2022.01); *G06V 20/58* (2022.01); *G06V 2201/07* (2022.01); *G06V 2201/12* (2022.01)

(58) Field of Classification Search
CPC ........ G06V 10/82; G06V 20/58; G06V 20/49; G06V 10/751; G06V 2201/12; G06V 2201/07
See application file for complete search history.

(56) References Cited

FOREIGN PATENT DOCUMENTS

DE      112020005609 T5      9/2022

OTHER PUBLICATIONS

Tsai et al., "Domain Adaptation for Structured Output via Discriminative Patch Representations", 2019. Proceedings of the IEEE/CVF international conference on computer vision, pp. 1456-1465 (Year: 2019).*

(Continued)

*Primary Examiner* — David F Dunphy
(74) *Attorney, Agent, or Firm* — NORTON ROSE FULBRIGHT US LLP

(57) ABSTRACT

A computer-implemented method for training a machine learning system for transferring images of a source domain into a target domain. The method includes: ascertaining source patches based on source images of a source domain and target patches based on target images of a target domain, the source patches and the target patches each being assigned pixel-by-pixel pieces of meta-information; ascertaining tuples, each including one source patch and at least one target patch which characterizes a neighbor of the source patch nearest to k according to a similarity measure, k being a hyperparameter of the method and the similarity measure characterizing a similarity between a source patch and a target patch based on the pixel-by-pixel meta-information of the source patch and of the target patch; training the machine learning system based on the source patches of the tuples and on the target patches of the tuples.

15 Claims, 9 Drawing Sheets

(56) References Cited

OTHER PUBLICATIONS

Liu, et al.: "Synthetic Data Augmentation Using Multiscale Attention CycleGAN for Aircraft Detection in Remote Sensing Images," IEEE Geoscience and Remote Sensing Letters, 19 (2021), pp. 1-5.
Mori, et al.: "Visual Explanation by Attention Branch Network for End-to-end Learning-based Self-driving," 2019 IEEE Intelligent Vehicles Symposium (IV), France, ( 2019), pp. 1577-1582.
Richter et al., "Enhancing Photorealism Enhancement," IEEE Transactions on Pattern Analysis and Machine Intelligence, vol. 45, No. 2, 2023, pp. 1700-1715. <https://www.computer.org/csdl/journal/tp/2023/02/09756256/1CvQegpaagU> Downloaded Apr. 18, 2023.

* cited by examiner

700 select source patch and target patch

701 process source patch and target patch with pre-trained object detector

702 ascertain first reconstruction

703 ascertain second reconstruction

704 ascertain first loss value

705 train the machine learning system

706 control system

40 actuator

10

30

401

300 control system

40

30

10a

400

METHOD AND DEVICE FOR TRAINING A NEURAL NETWORK

CROSS REFERENCE

The present application claims the benefit under 35 U.S.C. § 119 of German Patent Application No. DE 10 2022 204 263.8 filed on Apr. 29, 2022, which is expressly incorporated herein by reference in its entirety.

FIELD

The present invention relates to a method for training a machine learning system, to a method for training an object detector, to a method for operating a control system, to a computer program and to a machine-readable memory medium.

BACKGROUND INFORMATION

A method is described in German Patent Application No. DE 10 2022 201 679.3 for training a machine learning system, which includes the following steps:

providing a source image from a source domain and a target image from a target domain;

ascertaining a first generated image based on the source image with the aid of a first generator of the machine learning system and ascertaining a first reconstruction based on the first generated image with the aid of a second generator of the machine learning system;

ascertaining a second generated image based on the target image with the aid of the second generator and ascertaining a second reconstruction based on the second generated image with the aid of the first generator;

ascertaining a first loss value, the first loss value characterizing a first difference between the source image and the first reconstruction, the first difference being weighted according to a first attention map, and ascertaining a second loss value, the second loss value characterizing a second difference between the target image and the second reconstruction, the second difference being weighted according to a second attention map;

training the machine learning system by training the first generator and/or the second generator based on the first loss value and/or on the second loss value.

A method is described in Richter, et al., "Enhancing photorealism enhancement," 2021, https://arxiv.org/pdf/2105.04619v1.pdf for improving the realism of synthetic images, in which the images are improved by a convolution network, which utilizes the intermediate representations generated by conventional rendering pipelines. The network is trained using an adversarial training, which provides a strong supervision on multiple perception levels. This provides a new strategy for the selection of image fields during the training.

Many modern technical systems process data received from surroundings of the technical system using machine learning methods. These methods are typically able to establish predictions with respect to the data, specifically, based on statistical knowledge that has been acquired based on a set of training data.

Machine learning systems typically encounter problems if a statistical distribution of data processed by the machine learning system at the inference time differs from a statistical distribution of data used to train the machine learning system. This problem is also known in the field of machine learning as domain shift.

There are many examples of technical systems that are subject to a more or less natural or necessary domain shift. In the field of at least semi-autonomous vehicles, for example, the situation occurs in which new vehicles may be observed in regular cycles on the road. For sensors of at least semi-autonomous vehicles, such as LIDAR sensors, camera sensors or radar sensors, such vehicles typically also result in measurements that are thus unknown in potential training sets, since the vehicles are by definition new and thus also the sensor measurements recorded by them.

Another form of domain shift may occur in the change between two product generations of a product. For example, there are camera sensors that include machine learning systems in order to evaluate surroundings (i.e., a camera image of the surroundings) recorded by the camera with respect to, for example, positions of objects. Training such machine learning systems regularly requires a large number of training data. If the product generation of the camera now changes, if, for example, a new image sensor is now used, the machine learning system typically no longer achieves the same prediction accuracy as in the previous camera generation without being adapted. A change in product generation would therefore mean ascertaining new training data for the machine learning system. Whereas the pure data themselves may typically be cost-efficiently acquired, the annotations necessary for the training are much more difficult to obtain and are more cost-intensive, since the annotations must typically be prepared by human experts.

In the case of image data, methods of machine learning are typically used to adapt a source domain to a target domain. Common to these methods is the fact that models required for the respective methods are typically very large and thus, in a practical sense, unmanageable. One conventional approach is therefore to transfer in each case not complete images from the source domain into the target domain, but to transfer in each case sections of an image (patches). This results, however, in the known disadvantage that a random selection of patches from source domain and target domain for training a machine learning method for a domain transfer may result in a machine learning method lacking sufficient accuracy. This is due to the fact that the randomly selected patches may differ too widely from the semantic content to make a meaningful domain transfer possible.

SUMMARY

A method including features of present invention may make it advantageously possible to train a machine learning system, which is designed to adapt a source domain to a target domain (domain adaption).

In a first aspect, the present invention relates to a computer-implemented method for training a machine learning system, the machine learning system being trained for transferring images of a source domain into a target domain. According to an example embodiment of the present invention, the method includes the following steps:

ascertaining a plurality of source patches based on a plurality of source images of a source domain and a plurality of target patches based on a plurality of target images of a target domain, the source patches and the target patches being assigned pieces of meta-information, in each case pixel-by-pixel;

ascertaining a plurality of tuples, a tuple including in each case one source patch of the plurality of source patches and at least one target patch of the plurality of target patches, the at least one target patch characterizing a neighbor of the source patch closest to k according to a similarity measure, k being a hyper-parameter of the method and the similarity measure characterizing a similarity between a source patch and a target patch based on the pixel-by-pixel pieces of meta-information of the source patch and on the pixel-by-pixel pieces of meta-information of the target patch;

training the machine learning system based on the source patches of the tuples and on the target patches of the tuples.

A patch may be understood to mean a section of an image and thus, per se, an image. Patches from images of a source domain are referred to as source patches and patches from images of a target domain as target patches.

In this respect, the machine learning system may be understood as being designed to receive an image as an input and, based on this input, to ascertain a further image as an output. With the aid of the method, it is possible to train the machine learning system in such a way that it is able to convert images of the source domain into images of the target domain. In other words, the machine learning system is designed to generate images, namely target images based on source images.

A domain may be understood to mean a probability distribution, from which images may be generated. The method may therefore also be understood in such a way that it transforms images from one probability distribution (source domain) into a further probability distribution (target domain).

An image may be understood, in particular, to mean a sensor recording or also a measurement of a sensor. The use of sensors which are able to ascertain images as measurements may include, in particular, camera sensors, LIDAR sensors, radar sensors, ultrasonic sensors or thermal imaging cameras. An image may, however, also be generated synthetically, for example based on a computer simulation, for example through the rendering of a virtual world. For such synthetic images, it is often very easily possible to ascertain annotations in an automated manner, it then being possible with the aid of the method to generate from the synthetic images further images, which resemble in their appearance an image, for example, of a camera sensor.

According to an example embodiment of the present invention, in the method, source images and target images used for the training are assigned, in each case pixel-by-pixel, pieces of meta-information. In other words, each pixel is annotated with additional pieces of information. Based on these pieces of information, a similarity measure may be evaluated in order to thus ascertain a similarity between a patch of a source image and a patch of a target image. For the purpose of training, the patches may then be selected in such a way that as a result of similar patches in source domain and target domain, the machine learning system is confronted with patches having similar semantic content. This prevents random correlations between source patches and target patches during training from having the negative effect of the machine learning system learning false correlations between source domain and target domain. The mapping capability of the machine learning system of the source domain onto the target domain is thus improved as a result.

After the training, the machine learning system may either be applied to entire images or, for the purpose of transferring, may subdivide a source image into patches and transfer each patch individually, for example, according to a sliding window approach. The patches thus ascertained may then be combined to form a generated target image.

In preferred specific embodiments of the present invention, the pixel-by-pixel pieces of meta-information may characterize a semantic segmentation of a source patch or of a target patch. Alternatively or in addition, the pixel-by-pixel pieces of meta-information may characterize an instance segmentation of the source patch or of the target patch.

According to an example embodiment of the present invention, the pieces of meta-information may be generated, in particular during the training and therefore do not have to be present at the start of the training. For example, a pre-trained second machine learning system such as, for example, a neural network, may be designed to carry out a semantic segmentation and/or an instance segmentation for an image (and thus for a patch). During the training, patches from the source domain and/or from the target domain may be presented to this second machine learning system in order to thus obtain the pieces of meta-information for the respective patches.

The similarity between the source patch and the target patch may then preferably characterize a proportion of identical classes of the semantic segmentation of the source patch and of the semantic segmentation of the target patch and/or the similarity between the source patch and the target patch may characterize a proportion of identical classes of the instance segmentation of the source patch and of the instance segmentation of the target patch.

The source patch and the target patch may, in particular, have an identical size and the pieces of meta-information may thus be compared, in each case pixel-by-pixel, with one another. The similarity may then, for example, be a proportion of the positions of the pieces of meta-information of the two patches at which pieces of meta-information of both characterize the same class.

The inventors were able to find that such a distinctive similarity measure results in similarities between patches characterizing very precisely similarities of semantic contents of the patches and in the machine learning system thus being able to be better trained.

Alternatively or in addition, it is possible that the pixel-by-pixel pieces of meta-information characterize a piece of depth information of the pixels of the source patch or a piece of depth information of the pixels of the target patch.

It is possible, for example, that the images from which the patches are extracted are recorded using a 3D camera or a 2.5D camera and may thus be already provided to the method having pieces of depth information per pixel. Alternatively, it is possible that the pieces of depth information are ascertained with the aid of a machine learning method, for example, based on a neural network for the depth estimation of images, for example, a DepthNet.

The similarity between the source patch and the target patch may then also characterize a deviation of the pieces of depth information of the source patch from the pieces of depth information of the target patch, in particular, an average squared deviation. For example, the depth information of the meta-information for the source patch and the target patch may be compared, in each case pixel-by-pixel, in each case a deviation, for example, a squared Euclidean distance, may be ascertained, and an average of these deviations may be incorporated into the similarity. If the pieces of meta-information comprise only the pieces of depth information, the similarity may also only be the deviation described above.

It is also possible, however, that the pieces of meta-information of a patch may include different types of mean formation. In these cases, the similarity may be a linear combination of similarities of the respective types of pieces of meta-information. For example, the pieces of meta-information of a patch may include a semantic segmentation as well as depth information and the similarity may be a linear combination of a proportion of identical classifications of the semantic segmentation and the average squared deviation of the pieces of depth information.

Alternatively, it is also possible that the similarity also characterizes a perceptual feature similarity between the source patch and the target patch. The perceptual feature similarity may also be incorporated into the linear combination.

In preferred specific embodiments of the present invention, it is also possible that the step of training includes the following steps:

selecting a source patch from the source patches of the tuples and a target patch from the target patches of the tuples;

ascertaining a first generated image based on the source patch with the aid of a first generator of the machine learning system and ascertaining a first reconstruction based on the first generated image with the aid of a second generator of the machine learning system;

ascertaining a second generated image based on the target patch with the aid of the second generator and ascertaining a second reconstruction based on the second generated image with the aid of the first generator;

ascertaining a first loss value, the first loss value characterizing a first difference between the source patch and the first reconstruction, the first difference being weighted according to a first attention map, and ascertaining a second loss value, the second loss value characterizing a second difference between the target patch and the second reconstruction, the second difference being weighted according to a second attention map;

training the machine learning system by training the first generator and/or the second generator based on the first loss value and/or on the second loss value.

To ascertain the first generated image, the machine learning system may use a first generator, which may be trained during the method. A generator may be understood within the context of the present invention to mean a machine learning method, which ascertains an output image based on an input image.

Specifically, the generators described may be understood in such a way that they ascertain an image having the same size as the image that is used as input.

In order to enable a correlation and thus a suitable adaptation of the source domain to the target domain, the machine learning system further includes a second generator, which is designed to project images from the target domain back into the source domain. If an image is initially processed by a generator of the machine learning system and the image thus ascertained is then processed by the other generator, the image ascertained by the other generator may then be understood to be a reconstruction. The aim in conventional methods is, for one image from the source domain and one image from the target domain, in each case, to train the generators in such a way that the one respective reconstruction is identical to the respective image. The use of the first attention map and of the second attention map makes it advantageously possible to control the training in such a way that particular areas of the image of the source domain and of the image of the target domain may be classified as particularly important. The areas thus declared by the attention maps may advantageously contain objects which are recognizable in the image. The machine learning method is thus allowed to direct the focus during the reconstruction, in particular, at objects. The inventors were able to determine that a domain adaptation is possible as a result, which is able to very precisely transfer objects from images of the source domain into images of the target domain. In this way, a training data set may, for example, be ascertained for an object detector of the target domain, the training images being able to be generated from the images of a data set from the source domain and the annotations of the images of the data set being able to be used as annotations of the generated training images.

In contrast to conventional methods, a priori pieces of information indicating to the machine learning system which parts in the domain adaptation are particularly relevant are fed in this case during the training to the machine learning system with the aid of the first attention map and of the second attention map.

In preferred specific embodiments of the present invention, it is possible that the first attention map for pixels of the source patch characterizes in each case whether or not a pixel belongs to an object mapped on the source patch and/or the second attention map for pixels of the target patch characterizing in each case whether or not a pixel belongs to an object mapped on the target patch.

An image and a correspondingly ascertained reconstruction may be compared, in particular, pixel-by-pixel, i.e., a difference may be ascertained in each case between pixels at identical positions in the image and reconstruction, for example, a Euclidean distance or a square of the Euclidean distance. An attention map may then be used in order to assign each of these ascertained differences a weight, which a difference according to the attention map is to receive. Pixels of the image may be weighted, in particular, according to whether or not they characterize an object. An attention map in this case may be understood to mean an image including a channel or a matrix. The differences ascertained between the image and the reconstruction may also be understood to mean an image including a channel or a matrix, in which a difference at a particular position characterizes in each case the difference between the pixels of the image and of the reconstruction at the same position. A weighting of the values of the matrix of difference values may then be ascertained with the aid of a Hadamard product of the attention map including a matrix of difference values. On this basis, a loss value may then be ascertained, for example, by adding up, preferably adding up in a weighted manner, all elements of the result of the Hadamard product.

In one specific embodiment of the present invention, it is possible that the first attention map assigns the pixels of the source patch each a weight of 1 if the pixel belongs to an object mapped in the image, and a weight of 0 if the pixel does not belong to any object. In language typical of the field of object detection, an attention map may therefore be designed in such a way that it delimits foreground from background, specifically, indicated by the different values (1 for foreground, 0 for background). Alternatively or in addition, it is possible that the second attention map assigns the pixels of the target patch each a weight of 1 if the pixel belongs to an object mapped in the image, and assigns a weight of 0 if the pixel does not belong to any object.

Alternatively, it is also possible that the first attention map and/or the second attention map each characterize(s) probabilities with which corresponding pixels belong to an object.

In preferred specific embodiments of the present invention, it is possible that the first attention map is ascertained with the aid of an object detector based on the source patch and/or the second attention map being ascertained with the aid of the object detector based on the target patch.

The object detector may, in particular, be a machine learning system, for example, a neural network, which is designed for object detection. The object detector may be trained preferably on images of the source domain. To train the machine learning system provided in the present invention, the object detector may then ascertain the first attention map based on the source patch. For example, all pixels of the source patch recognized by the object detector as belonging to an object may be assigned the value 1 in the first attention map by the object detector and all other values of the attention map may be set to the value 0. Similarly, all pixels of the target patch recognized by the object detector as belonging to an object may be assigned the value 1 in the second attention map by the object detector and all other values of the attention map may be set to 0.

Object detectors are typically designed so that they are able to assign a probability to each pixel in the image, with the pixel being an object. For example, current neural networks for object detection output an object detection in the form of a bounding box and a probability, with the bounding box being an object known to the neural network. The pixels within the bounding box may each be mapped with the probability in the attention map. If the neural network ascertains overlapping object detections, the respectively greatest probability ascertained for a pixel may be used.

It is preferably also possible in the respective specific embodiments of the method that the steps of the method are carried out iteratively and the object detector ascertains in each iteration a first attention map for a source patch and/or ascertains in each iteration a second attention map for a target patch.

In general, a source patch may be understood as originating from a data set of the source domain and a target patch may be understood as originating from a data set of the target domain. Multiple images of the respective data sets, in particular, may be used for training and the steps of the training method may be iteratively carried out. It is possible, in particular, that the images of the target domain are not annotated. The object detector may then ascertain in each iteration step of the training, in each case for the source patch and the target patch of the iteration, object detections, on the basis of which the first attention map or the second attention map may then be ascertained, as explained in one of the above-described specific embodiments. The advantage to this is that as a result of the iterative training, the images of the data set of the source domain are able to be better transformed with each iteration step, i.e., the images transformed from the source domain increasingly resemble those of the target domain.

The machine learning system trained in the method preferably characterizes a neural network, in particular, a Cycle-GAN. Alternatively, the machine learning system may also characterize another neural network, which enables an image-to-image transformation (image-to-image translation), for example, a MADAN or a VAE-GAN.

In one further aspect, the present invention relates to a computer-implemented method for training an object detector. According to an example embodiment of the present invention, the method includes the following steps:

providing an input image and an annotation, the annotation characterizing a position of at least one object mapped in the input image;

ascertaining an intermediate image with the aid of the first generator of a machine learning system, which has been trained according to one of the specific embodiments of the first aspect of the present invention;

training the object detector, the object detector being trained in such a way that the object detector predicts for the intermediate image as input the object or the objects that are characterized by the annotation.

The method for training the object detector may be understood in such a way that with the aid of a trained machine learning system images are initially ascertained based on images of the source domain, which correspond in appearance to images of the target domain and the object detector is subsequently trained based on these images (i.e., on the intermediate images). In the process, the object detector may, in particular, be iteratively trained, a data set of training images of the source domain being able to be transformed prior to the training into a data set of intermediate images, using which the object detector is then trained. Alternatively, it is also possible that in each iteration step, an image from the source domain is transformed in each case into an intermediate image and the object detector is then trained using this intermediate image.

In this way, the object detector may be advantageously adapted to the target domain in an unsupervised manner without requiring object annotation for the images of the target domain. This accelerates the training method of the object detector, since the time for the annotation of images of the target domain is eliminated. With the same time budget, more images may thus be used to train the object detector. Conversely, the performance of the object detector may be improved as a result, since it is able to be trained with more images.

In general, an object detector within the context of the present invention may be understood to be configured in such a way that in addition to an object detection, i.e., in addition to a position and size of an object in the image, it also ascertains a class therefor, which characterizes the object of the detection.

The machine learning system in the method for training the object detector may be understood in such a way that it has been trained according to one specific embodiment of the method for training the machine learning system. Therefore, the method steps for training the machine learning system may, in particular, be part of the method for training the object detector. The method steps of the training of the machine learning system may, in particular, precede the method steps of the training of the object detector.

In a further aspect, the present invention relates to a computer-implemented method for ascertaining an activation signal for activating an actuator and/or a display device. According to an example embodiment of the present invention, the method includes the following steps:

providing an input image;

ascertaining objects, which are mapped on the input image, with the aid of an object detector, the object detector having been trained based on one form of the method for training the object detector;

ascertaining the activation signal based on the ascertained objects;

activating the actuator and/or the display device according to the activation signal.

The actuator may be understood, in particular, to mean a component of a technical system, which influences a movement of the technical system or within the technical system. The actuator may, for example, be a motor, which influences the movement of a robot, for example, an electric motor. Alternatively, it is also possible that the actuator controls a hydraulic system, for example, the actuator may be a pump, which drives a hydraulic cylinder. The actuator may also be a valve, which controls an inflow volume of a liquid or of a gas.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
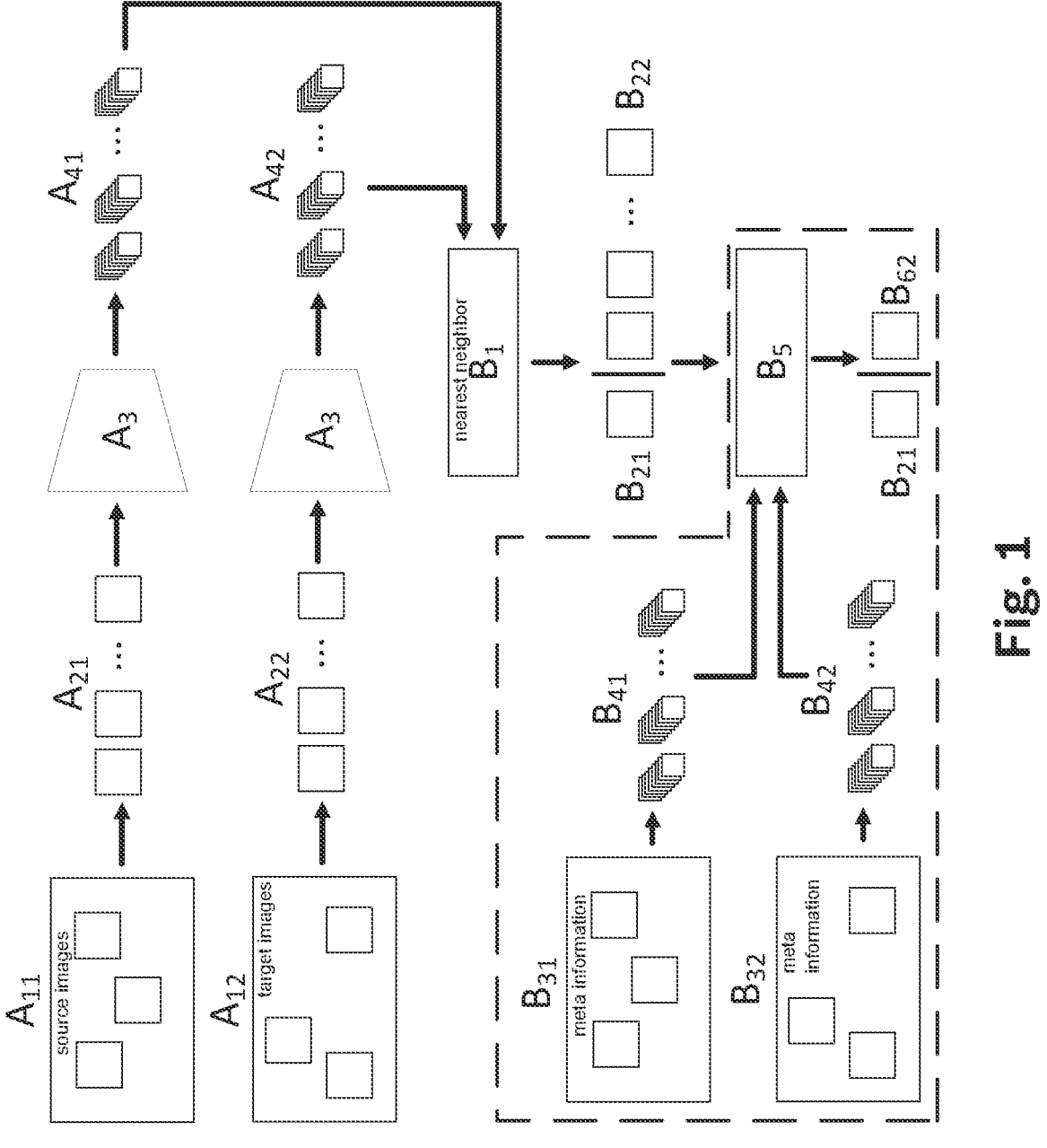
FIG. 1 schematically shows a method for selecting source patches and target patches, according to an example embodiment of the present invention.

FIG. 1 shows a method for selecting patches $A_{21}$ from images $A_{11}$ of a source domain and patches $A_{22}$ from images $A_{12}$ of a target domain. For images $A_{11}$ of the source domain, there exists corresponding pixel-by-pixel pieces of meta-information $B_{31}$ (for example, semantic segmentations, pieces of depth information or the like) and for images $A_{12}$ of the target domain, there exist corresponding pixel-by-pixel pieces of meta-information $B_{32}$ of the same type.

In the method, patches $A_{21}, A_{22}$ are initially preferably randomly extracted from respective source images $A_{11}$ and target images $A_{12}$. Perceptual features $A_{41}$, $A_{42}$ are then ascertained for patches $A_{21}$ of source images $A_{11}$ and patches $A_{22}$ of target images $A_{12}$ with the aid of a correspondingly configured neural network $A_3$.

A predefined number of nearest neighbors to k among patches $A_{22}$ of target images $A_{12}$ may subsequently be ascertained for all or for a subset of patches $A_{21}$ of source images $A_{11}$ in each case with the aid of a nearest neighbor method $B_1$, specifically, on the basis of a similarity of the perceptual features of the respective patches. Tuples made up of source patch $B_{21}$ and target patch $B_{22}$ are thus formed. The tuples thus ascertained may subsequently be refined ($B_5$). For this purpose, the pieces of meta-information of source patch $B_{21}$ and the target patch or patches $B_{22}$ of the tuple are compared with one another. In the process, the tuple may be reduced, in particular, to source patch $B_{21}$ and to a target patch $B_{62}$, which according to a similarity of the pieces of meta-information is the nearest neighbor within target patch $B_{22}$ of the tuple.

In this way, tuples may be ascertained in each case, which may be subsequently used for a training of a machine learning system.

Figure 2:
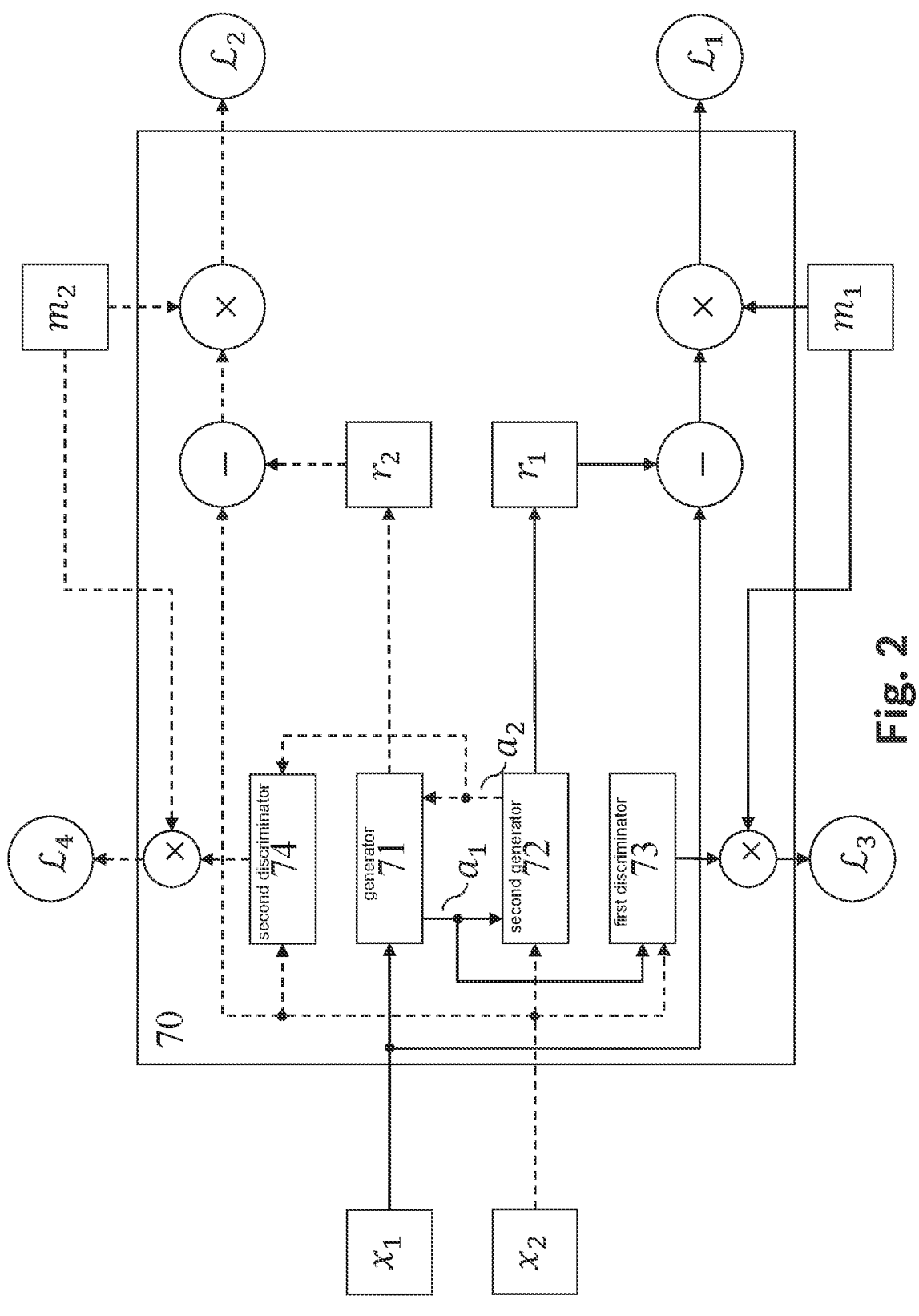
FIG. 2 shows a machine learning system, according to an example embodiment of the present invention.

FIG. 2 shows how loss values $\mathcal{L}_1, \mathcal{L}_2, \mathcal{L}_3, \mathcal{L}_4$ for training a machine learning system 70 may be ascertained with the aid of a source patch $x_1$ and a target patch $x_2$.

Source patch $x_1$ is transferred to a first generator 71 of machine learning system 70, generator 71 ascertaining a first generated image $a_1$ based on source patch $x_1$. In addition, target patch $x_2$ is transferred to a second generator 72 of machine learning system 70, second generator 72 ascertaining a second generated image $a_2$ based on target patch $x_2$.

First generated image $a_1$ is fed to second generator 72 in order to ascertain a first reconstruction $r_1$. Differences between first generated image $a_1$ and first reconstruction $r_1$ are subsequently ascertained pixel-by-pixel, for example, in each case a pixel-by-pixel distance according to an $L_p$ standard. The differences are subsequently weighted with the aid of a first attention map $m_1$ and the weighted differences are totaled in order to ascertain a first loss value $\mathcal{L}_1$.

Second generated image $a_2$ is fed to first generator 71 in order to ascertain a second reconstruction $r_2$. Differences between second generated image $a_2$ and second reconstruction $r_2$ are subsequently ascertained pixel-by-pixel, for example, in each case a pixel-by-pixel distance according to an $L_p$ standard. The differences are subsequently weighted with the aid of a second attention map $m_2$ and the weighted differences are totaled in order to ascertain a second loss value $\mathcal{L}_2$.

Target patch $x_2$ and first generated image $a_1$ are further fed to a first discriminator 73. First generator 71 and first discriminator 73 may be understood to mean a generative adversarial network (GAN). Based on target patch $x_2$ and first generated image $a_1$, first discriminator 73 then ascertains a first GAN loss value for each pixel of first generated image $a_1$ and for each pixel of target patch $x_2$. In other words, in contrast to the normal GAN loss value, the average of the pixel-by-pixel loss values is not used. The first GAN loss values may be understood to mean a matrix of loss values, in which a loss value at one position corresponds to a pixel position of target patch $x_2$ and of first generated image $a_1$. The first GAN loss values are subsequently weighted with the aid of first attention map $m_1$, and the weighted loss values are totaled in order to ascertain a third loss value $\mathcal{L}_3$.

Source patch $x_1$ and second generated image $a_2$ are further fed to a second discriminator 74. Second generator 72 and second discriminator 74 may be understood to mean a GAN. Based on source patch $x_1$ and second generated image $a_2$, second discriminator 74 then ascertains a second GAN loss value for each pixel of second generated image $a_2$ and for each pixel of target patch $x_2$. In other words, in contrast to the normal GAN loss value, the average of the pixel-by-pixel loss values is not used. The second GAN loss values may be understood to mean a matrix of loss values, in which a loss value at one position corresponds to a pixel position of source patch $x_1$ and of second generated image $a_2$. The second GAN loss values are subsequently weighed with the aid of second attention map $m_2$, and the weighted loss values are totaled in order to ascertain a fourth loss value $\mathcal{L}_4$.

Loss values $\mathcal{L}_1, \mathcal{L}_2, \mathcal{L}_3, \mathcal{L}_4$ may be subsequently totaled, preferably totaled in a weighted manner, in order to obtain a single loss value, with the aid of which parameters of first generator 71 and/or parameters of second generator 72 and/or parameters of first discriminator 73 and/or of second discriminator 74 may be changed. The weights of individual loss values $\mathcal{L}_1, \mathcal{L}_2, \mathcal{L}_3, \mathcal{L}_4$ in this case represent hyperparameters of the method.

Figure 3:
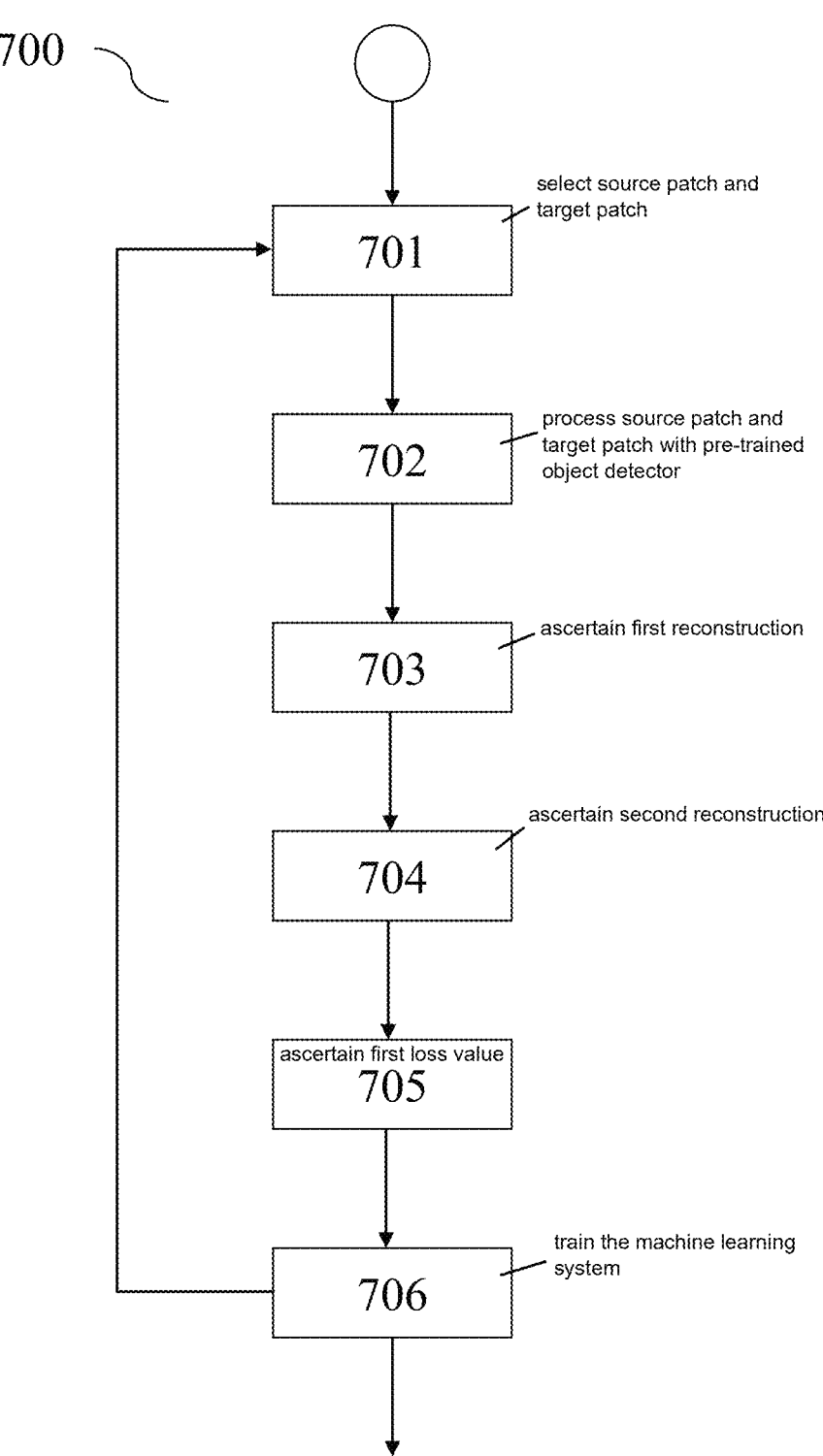
FIG. 3 schematically shows a method for training the machine learning system, according to an example embodiment of the present invention.

FIG. 3 shows the sequence of a training method 700 of machine learning system 70 in the form of a flowchart. The machine learning system is designed in the exemplary embodiment as a CycleGAN according to FIG. 1. In other specific embodiments, other designs are also possible.

In a first step 701, a source patch from a data set of a source domain and a target patch from a data set of a target domain are provided.

In a second step 702, source patch $x_1$ and target patch $x_2$ are processed with the aid of a pre-trained object detector, for example, a neural network designed for object detection, in order in each case to ascertain object detections.

Based on the object detections, a first attention map $m_1$ is then ascertained with respect to source patch $x_1$ and a second attention map $m_2$ is ascertained with respect to target patch $x_2$.

In a third step 703, first reconstruction $r_1$ is ascertained according to FIG. 1.

In a fourth step 704, the second reconstruction is ascertained according to FIG. 1.

In a fifth step 705, the single loss value is ascertained according to FIG. 1.

In a sixth step 706, the parameters of first generator 71, the parameters of second generator 72, the parameters of first discriminator 73, and the parameters of second discriminator 74 are trained with the aid of a gradient descent method and machine learning system 70 is thus trained.

The steps of the method may preferably be iteratively repeated. A particular number of iterations having been completed may, for example, be selected as an abort criterion of the iteration loop. Alternatively, it is also possible that the training is terminated based on the single loss value or on a loss value ascertained on a further data set.

Figure 4:
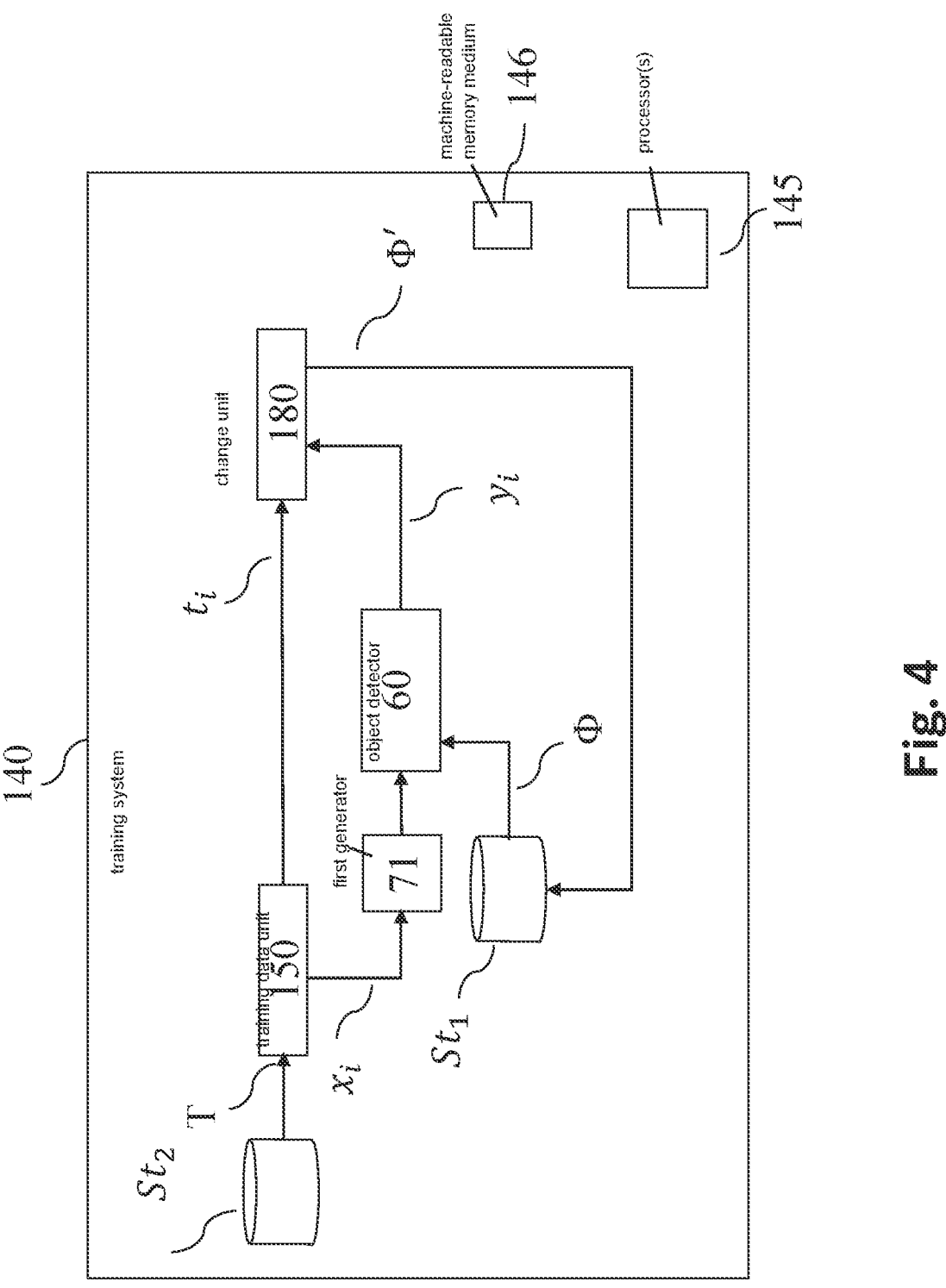
FIG. 4 schematically shows a training system, according to an example embodiment of the present invention.

FIG. 4 shows an exemplary embodiment of a training system 140 for training an object detector 60 with the aid of a training data set T. Training data set T includes a plurality of source patches $x_i$ of the source domain, which are used for training object detector 60, training data set T further including for one source patch $x_i$ each a desired output signal $t_i$, which corresponds to source patch $x_i$ and characterizes an object detection of source patch $x_i$.

For the purpose of training, a training data unit 150 accesses a computer-implemented data base $St_2$, data base $St_2$ being available to training data set T. Training data unit 150 ascertains from training data set T preferably randomly at least one source patch $x_i$ and desired output signal $t_i$ corresponding to source patch $x_i$, and transfers source patch $x_i$ to first generator 71 of trained machine learning system 70. First generator 71 ascertains an intermediate image on the basis of source patch $x_i$. The intermediate image is similar in appearance to the images of the target domain. The intermediate image is subsequently fed to object detector 60. Object detector 60 ascertains an output signal $y_i$ on the basis of the intermediate image.

Desired output signal $t_i$ and ascertained output signal $y_i$ are transferred to a change unit 180.

Based on desired output signal $t_i$ and ascertained output signal $y_i$, new parameters $\Phi'$ for object detector 60 are then determined by change unit 180. For this purpose, change unit 180 compares desired output signal $t_i$ and ascertained output signal $y_i$ with the aid of a loss function. The loss function ascertains a first loss value, which characterizes to what degree ascertained output signal $y_i$ differs from desired output signal $t_i$. In the exemplary embodiment, a negative logarithmic plausibility function (negative log-likelihood function) is selected as the loss function. In alternative exemplary embodiments, other loss functions are also possible.

It is further possible that ascertained output signal $y_i$ and desired output signal $t_i$ each include a plurality of sub-signals, for example, in the form of tensors, a sub-signal of desired output signal $t_i$ corresponding in each case to a sub-signal of ascertained output signal $y_i$. It is possible, for example, that a first sub-signal of output signal $t_i$ characterizes in each case an occurrence probability of an object with respect to a part of source patch $x_i$ and a second sub-signal of output signal $y_i$ characterizes the exact position of the object. In the event that ascertained output signal $y_i$ and desired output signal $t_i$ include a plurality of corresponding sub-signals, a second loss value is ascertained preferably for respectively corresponding sub-signals with the aid of a suitable loss function, and the ascertained second loss value is suitably merged with the first loss value, for example, via a weighted sum.

Change unit 180 ascertains new parameters $\Phi'$ on the basis of the first loss value. This occurs in the exemplary embodiment with the aid of a gradient descent method, preferably a stochastic gradient descent, Adam, or AdamW. In further exemplary embodiments, the training may also be based on an evolutionary algorithm or on a second order optimization.

Ascertained new parameters $\Phi'$ are stored in a model parameter memory $St_1$. Ascertained new parameters $\Phi'$ are preferably provided as parameters $\Phi$ to object detector 60.

In further preferred exemplary embodiments, the described training is repeated iteratively for a predefined number of iteration steps or iteratively repeated until the first loss value falls below a predefined threshold value. Alternatively or in addition, it is also possible that the training is terminated when an average first loss value with respect to a test data set or validation data set falls below a predefined threshold value. In at least one of the iterations, new parameters $\Phi'$ determined in a previous iteration are used as parameters $\Phi$ of object detector 60.

In addition, training system 140 may include at least one processor 145 and at least one machine-readable memory medium 146, which includes commands which, when they are executed by processor 145, prompt training system 140 to carry out a training method according to one of the aspects of the present invention.

Figure 5:
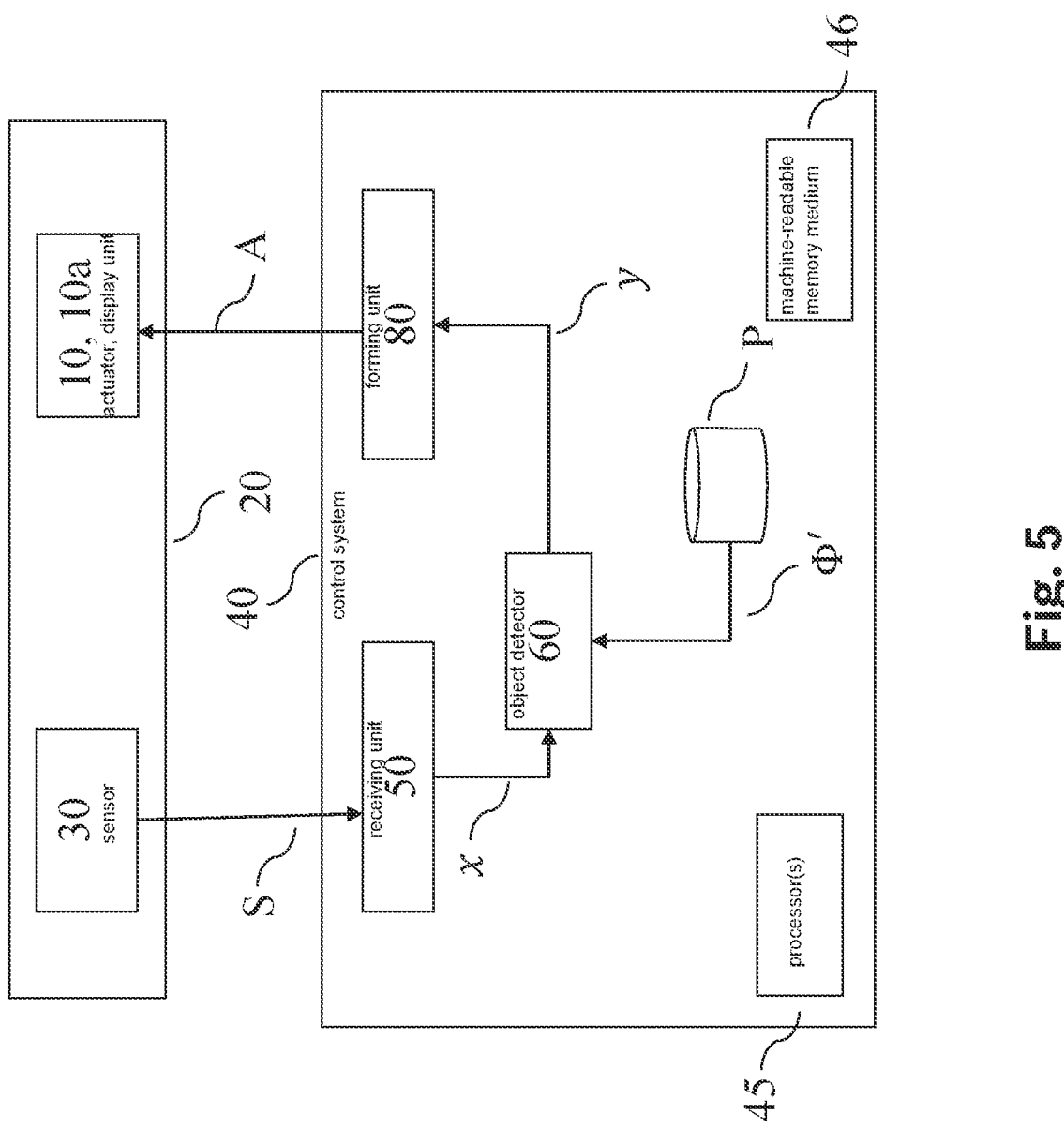
FIG. 5 schematically shows a structure of a control system for activating an actuator, according to an example embodiment of the present invention.

FIG. 5 shows the use of object detector 60 within a control system 40 for controlling an actuator 10 in surroundings 20 of actuator 10. At preferably regular temporal intervals, surroundings 20 is detected in a sensor 30, in particular, in an imaging sensor such as a camera sensor, which may also be provided as a plurality of sensors, for example, a stereo camera. Sensor signal S—or in the event of multiple sensors one sensor signal S each—of sensor 30 is transmitted to control system 40. Control system 40 thus receives a sequence of sensor signals S. Control system 40 ascertains therefrom activation signals A, which are transferred to actuator 10.

Control system 40 receives the sequence of sensor signals S of sensor 30 in an optional receiving unit 50, which converts the sequence of sensor signals S into a sequence of input signals x (alternatively, each sensor signal S may also be directly adopted as input signal x). Input signal x may, for example, be a section or a further processing of sensor signal S. In other words, input signal x is ascertained as a function of sensor signal S. The sequence of input signals x is fed to object detector 60.

Object detector 60 is preferably parameterized by parameters Φ, which are stored in and provided by a parameter memory P.

Object detector 60 ascertains output signals y from input signals x. Output signals y are fed to an optional forming unit 80, which uses same to ascertain activation signals A, which are fed to actuator 10 in order to activate actuator 10 accordingly.

Actuator 10 receives activation signals A, is activated accordingly and executes a corresponding action. Actuator 10 in this case may include a (not necessarily structurally integrated) activation logic, which ascertains from activation signal A a second activation signal, using which actuator 10 is activated.

In further specific embodiments, control system 40 includes sensor 30. In still further specific embodiments, control system 40 alternatively or in addition also includes actuator 10.

In further preferred specific embodiments, control system 40 includes at least one processor 45 and at least one machine-readable memory medium 46, on which instructions are stored which, when they are executed on the at least one processor 45, prompt control system 40 to carry out the method according to the present invention.

In alternative specific embodiments, a display unit 10a is provided alternatively or in addition to actuator 10.

Figure 6:
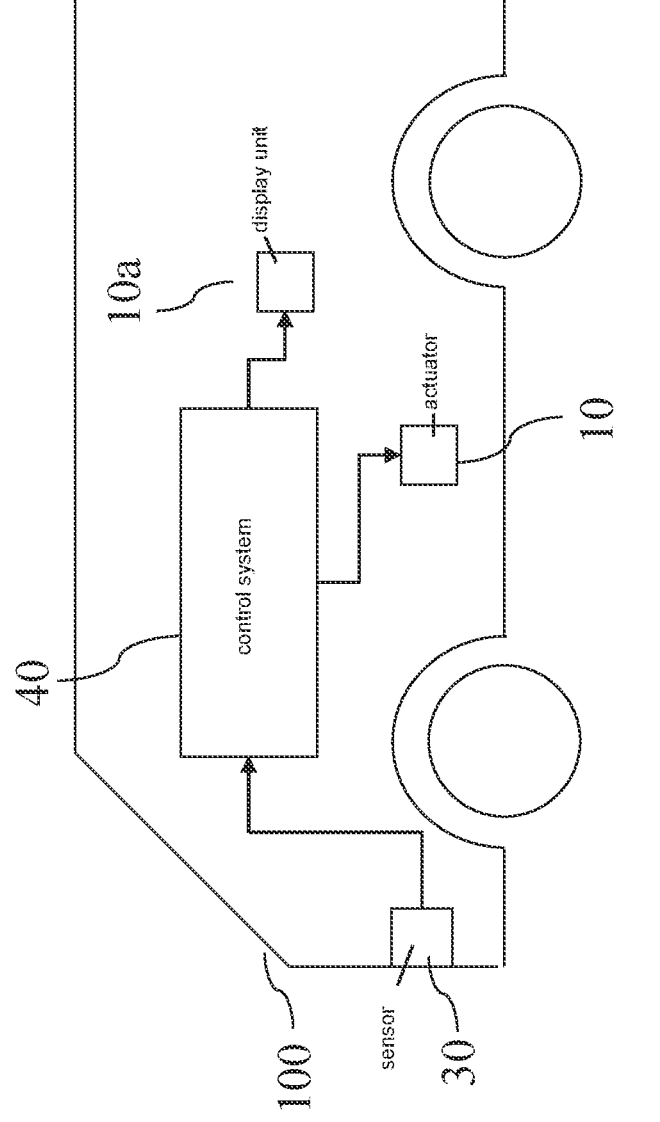
FIG. 6 schematically shows an exemplary embodiment for controlling an at least semi-autonomous robot, according to the present invention.

FIG. 6 shows how control system 40 may be used for controlling an at least semi-autonomous robot, here, an at least semi-autonomous motor vehicle 100.

Sensor 30 may, for example, be a video sensor situated preferably in motor vehicle 100.

Object detector 60 is configured to identify objects recognizable in input images x.

Actuator 10 situated preferably in motor vehicle 100 may, for example, be a brake, a drive or a steering system of motor vehicle 100. Activation signal A may then be ascertained in such a way that actuator or actuators 10 is/are activated in such a way that motor vehicle 100 prevents, for example, a collision with objects identified by object detector 60, in particular when objects of particular classes, for example, pedestrians, are involved.

Alternatively or in addition, display unit 10a may be activated with activation signal A and, for example, the identified objects may be displayed. It is also possible that display unit 10a is activated with activation signal A in such a way that it outputs a visual or acoustic warning signal if it is ascertained that motor vehicle 100 threatens to collide with one of the identified objects. The warning with the aid of a warning signal may also take place with the aid of a haptic warning signal, for example, via a vibration of a steering wheel of motor vehicle 100.

Alternatively, the at least semi-autonomous robot may also be another mobile robot (not depicted), for example, one which moves by flying, swimming, diving or pacing. The mobile robot may, for example, also be an at least semi-autonomous lawn mower or an at least semi-autonomous cleaning robot. In these cases as well, activation signal A may be ascertained in such a way that the drive and/or the steering of the mobile robot is/are activated in such a way that the at least semi-autonomous robot prevents, for example, a collision with objects identified by object detector 60.

Figure 7:
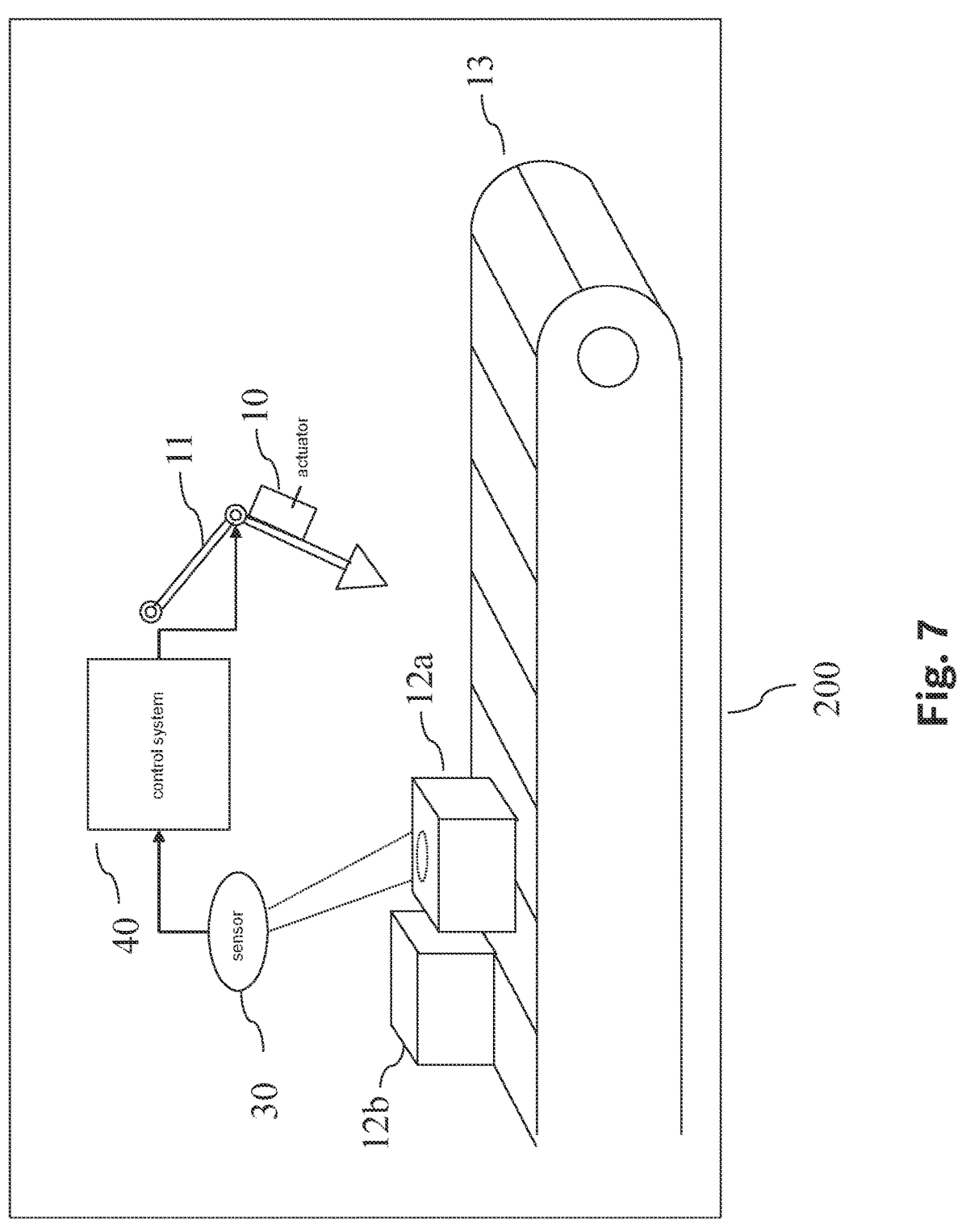
FIG. 7 schematically shows an exemplary embodiment for controlling a manufacturing system, according to the present invention.

FIG. 7 shows an exemplary embodiment, in which control system 40 is used for activating a manufacturing machine 11 of a manufacturing system 200 via activation of an actuator 10, which controls manufacturing machine 11. Manufacturing machine 11 may, for example, be a machine for punching, sawing, drilling, welding and/or cutting. It is further possible that manufacturing machine 11 is designed to grip a manufactured product 12a, 12b with the aid of a gripper.

Sensor 30 may, for example, be a video sensor, which detects, for example, the conveyor surface of a conveyor belt 13, manufactured products 12a, 12b being capable of being situated on conveyor belt 13. Input signals x in this case are input images x. Object detector 60 may, for example, be configured to ascertain a position of manufactured products 12a, 12b on the conveyor belt. Actuator 10 controlling manufacturing machine 11 may then be activated as a function of the ascertained positions of manufactured products 12a, 12b. For example, actuator 10 may be activated in such a way that it punches, saws, drills and/or cuts a manufactured product 12a, 12b at a predetermined point of manufactured product 12a, 12b.

It is further possible that object detector 60 is designed, alternatively or in addition to the position, to ascertain further characteristics of a manufactured product 12a, 12b. It is possible, in particular, that object detector 60 ascertains whether a manufactured product 12a, 12b is defective and/or damaged. In this case, actuator 10 may be activated in such a way that manufacturing machine 11 rejects a defective and/or damaged manufactured product 12a, 12b.

Figure 8:
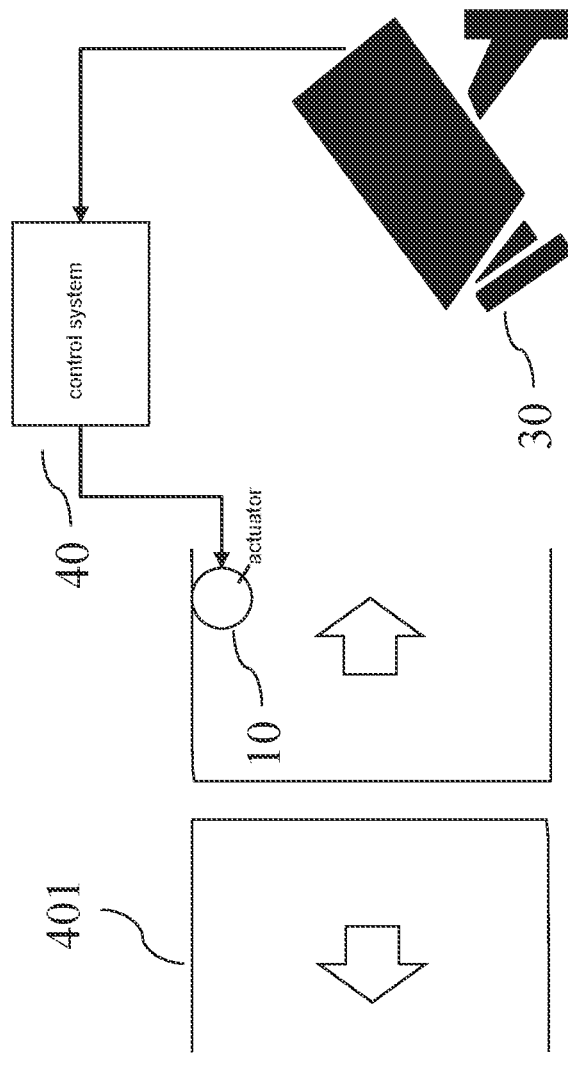
FIG. 8 schematically shows an exemplary embodiment for controlling an access system, according to the present invention.
Figure 8:

FIG. 8 shows an exemplary embodiment, in which control system 40 is used for controlling an access system 300. Access system 300 may include a physical access control, for example, a door 401. Sensor 30 may be, in particular a video sensor or a thermal imaging sensor, which is configured to detect an area in front of door 401. Object detector 60 may, in particular, detect persons in a transmitted input image x. If multiple persons have been detected simultaneously, the identity of the persons, for example, may be particularly reliably ascertained by a classification of the persons (i.e., of the objects) relative to one another, for example, by an analysis of their movements.

Actuator 10 may be a lock, which releases or does not release—for example, opens or does not open door 401—the access control being a function of activation signal A. For this purpose, activation signal A may be selected as a function of output signal y ascertained with the aid of object detector 60 for input image x. It is possible, for example, that output signal y includes pieces of information, which characterize the identity of a person detected by object detector 60, and activation signal A is selected based on the identity of the person.

A logical access control instead of the physical access control may also be provided.

Figure 9:
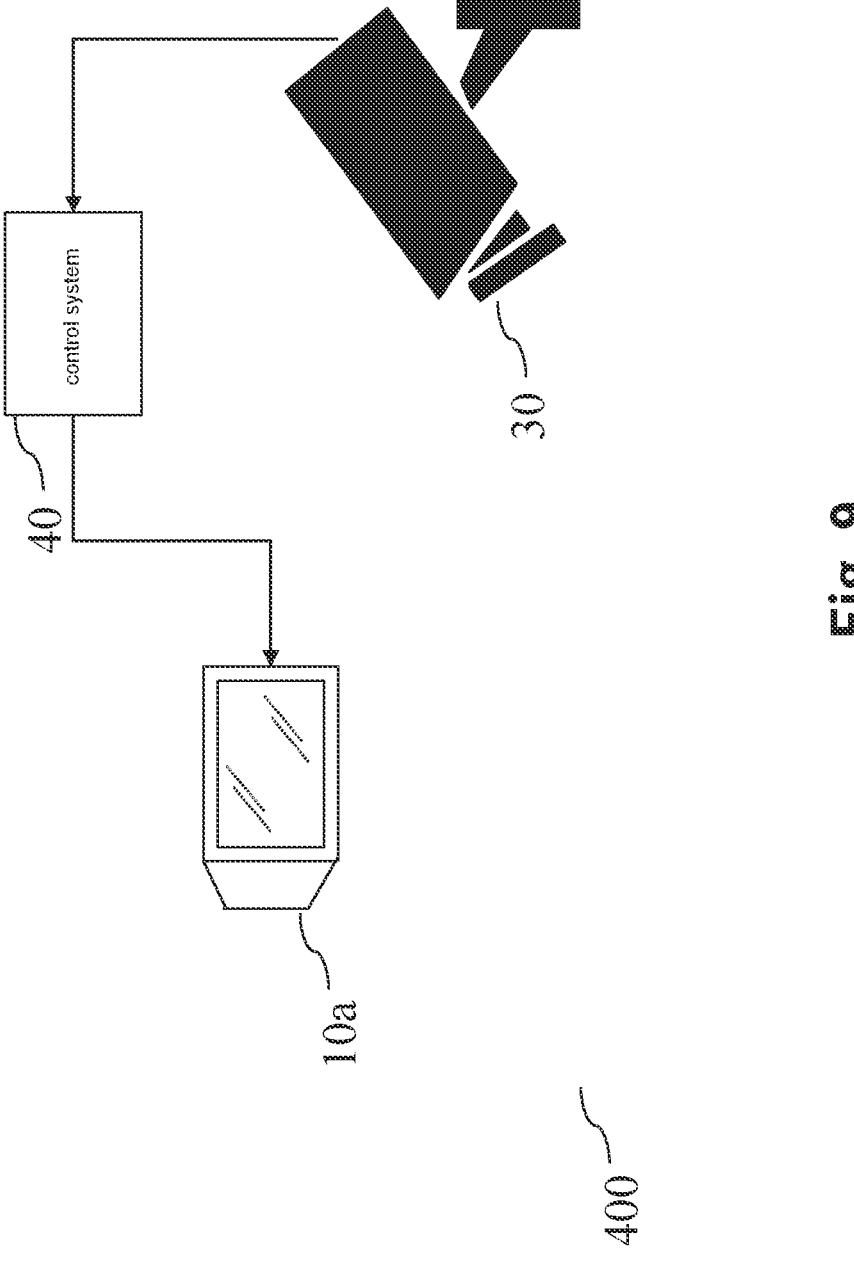
FIG. 9 schematically shows an exemplary embodiment for controlling a monitoring system, according to the present invention.

FIG. 9 shows an exemplary embodiment, in which control system 40 is used for controlling a monitoring system 400. This exemplary embodiment differs from the exemplary embodiment shown in FIG. 4 in that instead of actuator 10, display unit 10a is provided, which is activated by control system 40. For example, sensor 30 may record an input image x in which at least one person may be recognized, and the position of the at least one person may be detected with the aid of object detector 60. Input image x may then be shown on display unit 10*a*, the detected persons being capable of being shown in a color-highlighted manner.

The term "computer" includes arbitrary devices for executing predefinable calculation rules. These calculation rules may be present in the form of software, or in the form of hardware, or also in a mixed form of software and hardware.

In general, a plurality may be understood to mean indexed, i.e., each element of the plurality is assigned a unique index, preferably by assigning consecutive integers to the elements included in the plurality. If a plurality includes N elements, N being the number of elements in the plurality, the elements are preferably assigned the integers from 1 to N.

What is claimed is:

1. A computer-implemented method for training a machine learning system, the machine learning system being trained to transfer images of a source domain into a target domain, the method comprising the following steps:

ascertaining a plurality of source patches based on a plurality of source images of a source domain, and ascertaining a plurality of target patches based on a plurality of target images of a target domain, the source patches and the target patches each being assigned pixel-by-pixel pieces of meta-information;

ascertaining a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch, wherein the pixel-by-pixel pieces of meta-information characterize a piece of depth information of pixels of the source patch or a piece of depth information of pixels of the target patch; and training the machine learning system based on the source patches of the tuples and on the target patches of the tuples.

2. The method as recited in claim 1, wherein the pixel-by-pixel pieces of meta-information characterize a semantic segmentation of the source patch or of the target patch and/or the pixel-by-pixel pieces of meta-information characterize an instance segmentation of the source patch or of the target patch.

3. The method as recited in claim 2, wherein the similarity measure between the source patch and the target patch characterizes a portion of identical classes of the semantic segmentation of the source patch and of the semantic segmentation of the target patch and/or the similarity measure between the source patch and the target patch characterizes a portion of identical classes of an instance segmentation of the source patch and of an instance segmentation of the target patch.

4. The method as recited in claim 1, wherein the similarity measure between the source patch and the target patch characterizes a deviation between the pieces of depth information of the source patch and the pieces of depth information of the target patch, including an average squared deviation.

5. The method as recited in claim 1, wherein the similarity measure also characterizes a perceptual feature similarity between the source patch and the target patch.

6. A computer-implemented method for training a machine learning system, the machine learning system being trained to transfer images of a source domain into a target domain, the method comprising the following steps:

ascertaining a plurality of source patches based on a plurality of source images of a source domain, and ascertaining a plurality of target patches based on a plurality of target images of a target domain, the source patches and the target patches each being assigned pixel-by-pixel pieces of meta-information;

ascertaining a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch; and training the machine learning system based on the source patches of the tuples and on the target patches of the tuples, wherein the training step includes the following steps:

selecting a source patch from the source patches of the tuples and a target patch from the target patches of the tuples;

ascertaining a first generated image based on the selected source patch using a first generator of the machine learning system and ascertaining a first reconstruction based on the first generated image using a second generator of the machine learning system;

ascertaining a second generated image based on the selected target patch using the second generator and ascertaining a second reconstruction based on the second generated image using the first generator;

ascertaining a first loss value, the first loss value characterizing a first difference between the selected source patch and the first reconstruction, the first difference being weighted according to a first attention map, and ascertaining a second loss value, the second loss value characterizing a second difference between the selected target patch and the second reconstruction, the second difference being weighted according to a second attention map; and training the machine learning system by training the first generator and/or the second generator based on the first loss value and/or on the second loss value.

7. The method as recited in claim 6, wherein the first attention map, for each pixel of the source patch characterizes in each case whether or not the pixel belongs to an object mapped on the source patch and/or the second attention map for each pixel of the target patch characterizes in each case whether or not the pixel belongs to an object mapped on the target patch.

8. The method as recited in claim 6, wherein the first attention map is ascertained using an object detector based on the selected source patch and/or the second attention map is ascertained using the object detector based on the selected target patch.

9. The method as recited in claim 8, wherein the steps of the method are carried out iteratively and the object detector ascertains in each iteration a respective first attention map for a source patch and/or ascertains in each iteration a respective second attention map for a target patch.

10. The method as recited in claim 9, wherein the object detector is configured to ascertain objects in images of road traffic scenes.

11. The method as recited in claim 6, wherein the machine learning system characterizes a CycleGAN.

12. A computer-implemented method for training an object detector comprising the following steps:

providing an input image and an annotation, the annotation characterizing a position of at least one object mapped in the input image;

ascertaining an intermediate image using a first generator of a machine learning system, the machine learning system the machine learning system being trained to transfer images of a source domain into a target domain, including:

ascertaining a plurality of source patches based on a plurality of source images of a source domain, and ascertaining a plurality of target patches based on a plurality of target images of a target domain, the source patches and the target patches each being assigned pixel-by-pixel pieces of meta-information;

ascertaining a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch; and training the machine learning system based on the source patches of the tuples and on the target patches of the tuples, including:

selecting a source patch from the source patches of the tuples and a target patch from the target patches of the tuples;

ascertaining a first generated image based on the selected source patch using a first generator of the machine learning system and ascertaining a first reconstruction based on the first generated image using a second generator of the machine learning system;

ascertaining a second generated image based on the selected target patch using the second generator and ascertaining a second reconstruction based on the second generated image using the first generator;

ascertaining a first loss value, the first loss value characterizing a first difference between the selected source patch and the first reconstruction, the first difference being weighted according to a first attention map, and ascertaining a second loss value, the second loss value characterizing a second difference between the selected target patch and the second reconstruction, the second difference being weighted according to a second attention map; and training the machine learning system by training the first generator and/or the second generator based on the first loss value and/or on the second loss value;

training the object detector, the object detector being trained in such a way that the object detector for the intermediate image predicts as input the at least one object, which are characterized by the annotation.

13. A computer-implemented method for ascertaining an activation signal for activating an actuator and/or a display device, comprising the following steps:

providing an input image;

ascertaining objects mapped on the input image using an object detector, the object detector having been trained by:

providing a first input image and an annotation, the annotation characterizing a position of at least one object mapped in the first input image;

ascertaining an intermediate image using a first generator of a machine learning system, the machine learning system the machine learning system being trained to transfer images of a source domain into a target domain, including:

ascertaining a plurality of source patches based on a plurality of source images of a source domain, and ascertaining a plurality of target patches based on a plurality of target images of a target domain, the source patches and the target patches each being assigned pixel-by-pixel pieces of meta-information;

ascertaining a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch; and training the machine learning system based on the source patches of the tuples and on the target patches of the tuples, including:

selecting a source patch from the source patches of the tuples and a target patch from the target patches of the tuples;

ascertaining a first generated image based on the selected source patch using a first generator of the machine learning system and ascertaining a first reconstruction based on the first generated image using a second generator of the machine learning system;

ascertaining a second generated image based on the selected target patch using the second generator and ascertaining a second reconstruction based on the second generated image using the first generator;

ascertaining a first loss value, the first loss value characterizing a first difference between the selected source patch and the first reconstruction, the first difference being weighted according to a first attention map, and ascertaining a second loss value, the second loss value characterizing a second difference between the selected target patch and the second reconstruction, the second difference being weighted according to a second attention map; and training the machine learning system by training the first generator and/or the second generator based on the first loss value and/or on the second loss value;

training the object detector, the object detector being trained in such a way that the object detector for the intermediate image predicts as input the at least one object, which are characterized by the annotation;

ascertaining the activation signal based on the ascertained objects;

activating the actuator and/or the display device according to the activation signal.

14. A training device configured to train a machine learning system, the machine learning system being trained to transfer images of a source domain into a target domain, the training device configured to:

ascertain a plurality of source patches based on a plurality of source images of a source domain, and ascertaining a plurality of target patches based on a plurality of target images of a target domain, the source patches and the target patches each being assigned pixel-by-pixel pieces of meta-information;

ascertain a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch, wherein the pixel-by-pixel pieces of meta-information characterize a piece of depth information of pixels of the source patch or a piece of depth information of pixels of the target patch; and train the machine learning system based on the source patches of the tuples and on the target patches of the tuples.

15. A non-transitory machine-readable memory medium on which is stored a computer program for training a machine learning system, the machine learning system being trained to transfer images of a source domain into a target domain, the computer program, when executed by a processor, causing the processor to perform the following steps:

ascertaining a plurality of source patches based on a plurality of source images of a source domain, and ascertaining a plurality of target patches based on a plurality of target images of a target domain, the source patches and the target patches each being assigned pixel-by-pixel pieces of meta-information;

ascertaining a plurality of tuples, each tuple of the tuples including one source patch of the plurality of source patches and at least one target patch of the plurality of target patches, the at least one target patch characterizing a neighbor of the source patch nearest to k according to a similarity measure, k being a hyperparameter of the method and the similarity measure characterizing a similarity between a source patch and a target patch based on the pieces of pixel-by-pixel meta-information of the source patch and on the pixel-by-pixel pieces of meta-information of the target patch; and training the machine learning system based on the source patches of the tuples and on the target patches of the tuples.

\* \* \* \* \*